May 10, 1966 H. V. PATE ETAL 3,250,658
OAKUM WRAPPING MACHINE
Filed July 25, 1962 3 Sheets-Sheet 1

INVENTORS
HAROLD V. PATE
FREDRICK J. SCHNAKENBERG
BY Cohn and Powell
ATTORNEYS

May 10, 1966  H. V. PATE ETAL  3,250,658
OAKUM WRAPPING MACHINE
Filed July 25, 1962  3 Sheets-Sheet 2

INVENTORS
HAROLD V. PATE
FREDRICK J. SCHNAKENBERG
BY Cohn and Powell
ATTORNEYS

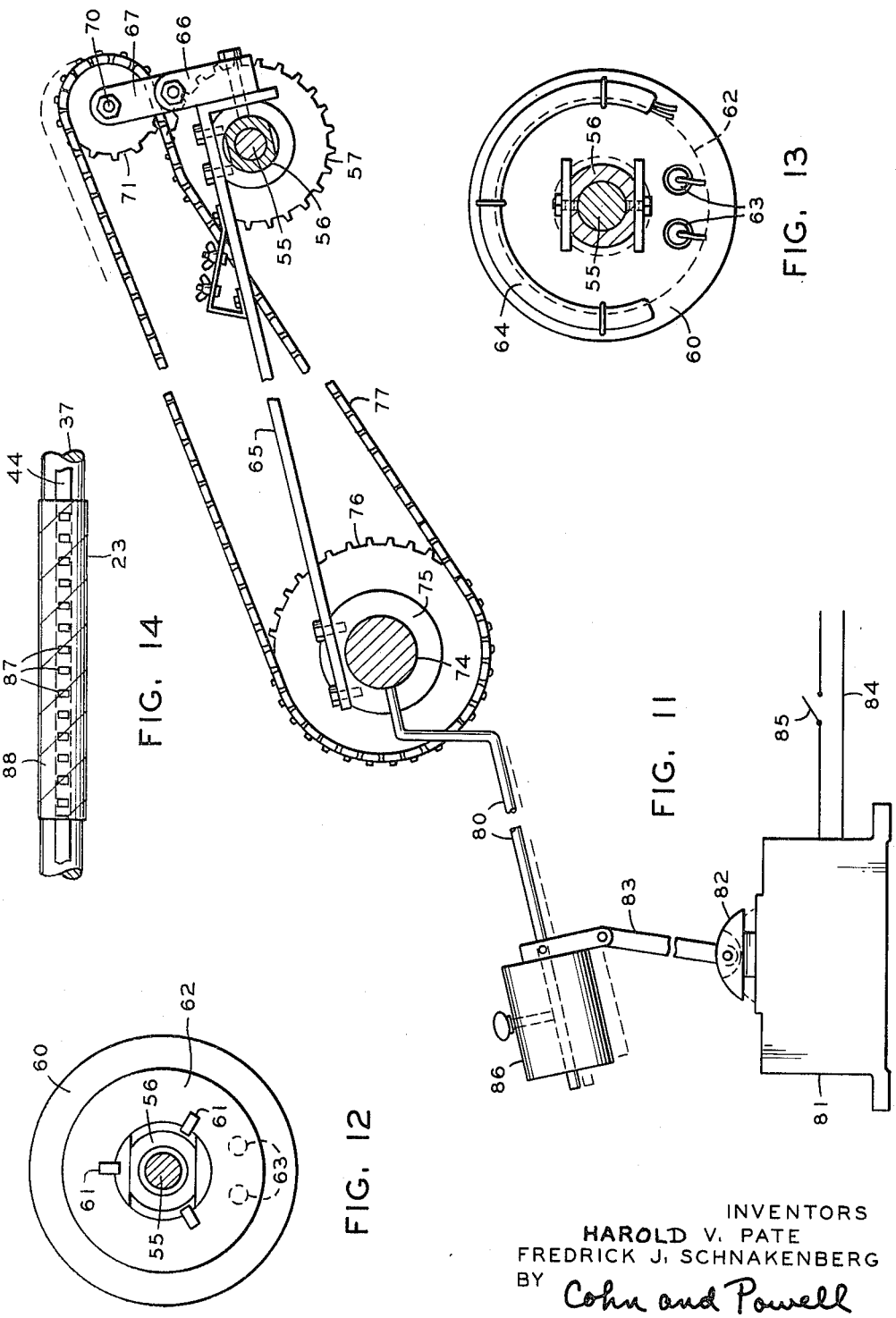

United States Patent Office 3,250,658
Patented May 10, 1966

3,250,658
OAKUM WRAPPING MACHINE
Harold V. Pate and Fred J. Schnakenberg, St. Louis, Mo., assignors to American Mfg. Co. Inc., St. Louis, Mo., a corporation of Delaware
Filed July 25, 1962, Ser. No. 212,232
15 Claims. (Cl. 156—428)

This invention relates generally to improvements in an oakum wrapping machine, and more particularly to improvements for wrapping an oakum adapted to seal a bell and spigot type joint.

It is an important object to provide a machine that makes a rope-like strand of oakum including an elongate, expansible core comprised of fibers and mineral filler, and a plastic film jacket about the core through which moisture can be introduced to expand the core.

An important object is achieved by the provision of means for directing the oakum core along a predetermined path of travel, means for wrapping a plastic film jacket about the core, and heat-sealing means disposed in the travel path and adapted to engage and seal the film together.

Another important objective is realized by the structural arrangement of the heat-sealing means to include peripherally spaced, radially extending teeth that engage the film longitudinally to form a series of regularly spaced holes in the film along the length of the oakum strand which holes serve to admit moisture and are themselves peripherally sealed to secure the wrapped film together and in place about the core. These spaced holes provide a longitudinal seal seam.

Still another important objective is afforded by the mechanism that wraps a single ribbon of elastic film spirally on the core with an overlap of approximately one half of the ribbon width, so as to give a double thickness of the film at all points. The cooperating heat-sealing means seals and perforates the overlapping spiralled film in the overlap along a longitudinal seam, thereby enabling moisture to enter through the perforations and also between the spirals.

An important object is achieved by the provision of an anvil immediately adjacent the core, the plastic film ribbon being wrapped spirally in overlapping relation about the anvil and core, while the heat-sealing means engages the film over the anvil and seals the film along a longitudinal seam, and by the provision of means for moving the oakum so as to move the film into operative relation to the heat-sealing means and to slide the sealed film off of such anvil.

Another important object is provided by a tape of a material that does not adhere to the plastic film under heat which is directed and fed continuously between the anvil and plastic film in a position so that the heat sealing means engages the film over the tape, thereby precluding the film from adhering to the anvil, assuring perforation and sealing in a series of regularly spaced holes, and enabling easy removal of the film from the anvil.

Yet another important object is realized by the provision of a pair of adjacent overlapping plates, one of which extends beyond the other to provide the anvil. The film is wrapped about the overlapped plates and the adjacent core. The tape is disposed slidably between the plates and extends over the anvil, the tape being maintained in a definite track to assure positioning under the heat-sealing means as the tape and film are moved over the anvil.

An important object is achieved by a groove extending lengthwise between the plates and opening at the anvil, the groove acting as a track that slidably receives the tape and serves to guide the tape in a defined path over the anvil so that the sealing of the film is accomplished on the anvil directly over the tape.

Other important advantages are afforded by the specific structural arrangement for guiding and feeding the tape so that the film is wrapped about the core and overlapped plates in a region such that the film does not engage or otherwise interfere with the tape, and yet the wrapped film is moved simultaneously with the tape over the anvil for sealing operation.

Another important objective is realized by the provision of a pair of concentric tubes through which the core extends, the tubes having an extension about which the film is wrapped, and one of the tubes extending beyond the other to provide a heat-sealing anvil forwardly of the extension. The tape is slidably extended between the tubes including the extension and extended along the anvil as described previously.

It is an important objective to provide an improved structure for directing a core in a traveled path, and for wrapping and sealing a film jacket on the core in a particular manner. Specifically, a fixed tubular sleeve is provided through which the core extends, and a supply of plastic film is carried by a rotative bearing on the sleeve so as to wrap the film spirally in overlapped relation on the core and on overlapped extension plates at one end of the sleeve as the core is pulled through the sleeve and through the heat-sealing zone.

An important object is to provide an oakum wrapping machine that is simple and durable in construction, economical to manufacture, efficient in operation, and which is substantially automatic in that it requires little supervision.

The foregoing and numerous other objects and advantages of the invention will more clearly appear from the following detailed description of a preferred embodiment particularly when considered in connection with the accompanying drawings, in which:

FIG. 7 is a cross sectional view of the fixed sleeve and the core-receiving tubes;

FIG. 8 is a cross section as seen along line 8—8 of FIG. 7;

FIG. 9 is a cross sectional view of the tube extension as seen along line 9—9 of FIG. 7;

FIG. 10 is a cross sectional view of the anvil as seen along line 10—10 of FIG. 7;

FIG. 11 is a side elevational view of the drive mechanism as seen in a plane indicated by line 11—11 of FIG. 2;

FIG. 12 is a side elevational view of the heater assembly as seen from the left of FIG. 2;

FIG. 13 is a side elevational view of the heater assembly as seen from the right of FIG. 2, and FIG. 14 is a fragmentary top plan view of a length of oakum made by the machine.

Figure 1:
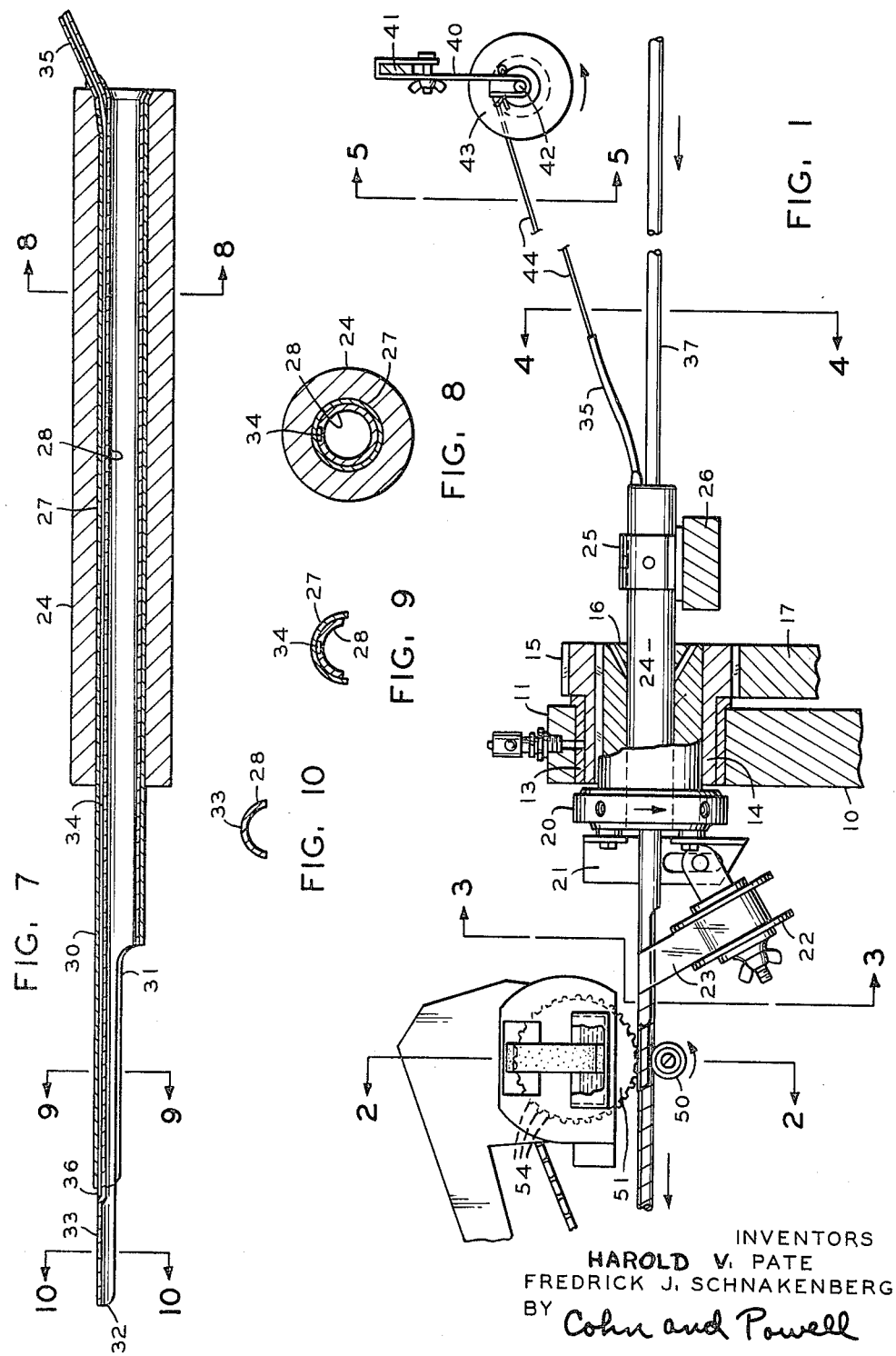
FIG. 1 is a side elevational view, partly in cross section of the oakum wrapping machine.
Figure 3:
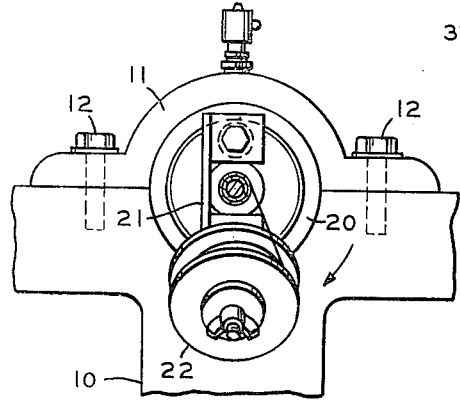
FIG. 3 is an end view of the film wrapping means as seen along line 3—3 of FIG. 1.
Figure 6:
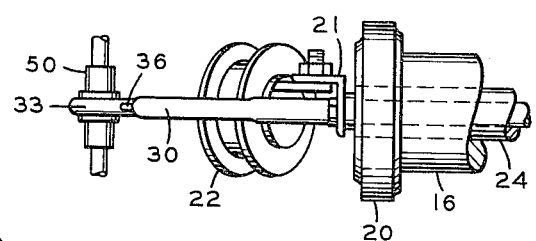
FIG. 6 is a top plan view of the film wrapping mechanism and the heat sealing anvil.

Referring now by characters of reference to the drawing, and first to FIG. 1, it is seen that machine includes an upstanding vertical frame portion 10 having a pillow block 11 attached by side bolts 12 shown in FIG. 3. The frame 10 and pillow block 11 retain a bearing liner 13 shown best in FIG. 1, which rotatively journals a hub 14 of pinion 15 and its associated rotary bearing 16 keyed together in driving relation. The pinion 15 is located at the rear end of frame portion 10 and is adapted to mesh operatively with a drive gear 17.

The rotary bearing 16 extends beyond the opposite or front end of the frame portion 10 and carries a collar 20. Attached to the front face of collar 20 is a bracket 21. A spool 22 is pivotally mounted on and carried by the bracket 21. For reasons which will appear later, the spool 22 can be adjusted and fixed in any desired angular relationship with the bracket 21. Upon rotation of pinion 15 by drive gear 17 and consequently rotation of bearing 16, collar 20 and bracket 21, the spool 22 will be rotated about the longitudinal axis passed through the bore of the bearing 16.

The spool 22 carries a roll of elastic plastic film such as polyethylene capable of being heat-sealed together. As will be apparent upon subsequent description of parts, the ribbon of plastic film is continuously wrapped as the spool 22 is rotated. Because of the inclination of the spool 22 and the movement of the wrapped core, the plastic film 23 is wrapped spirally.

Disposed within the rotary bearing 16 and fixed relative to the frame 10 of the machine, is a tubular sleeve 24. The front of sleeve 24 extends forwardly to the front face of collar 20, while the rear end of sleeve 24 extends rearwardly beyond the pinion 15. Specifically, the rear end of sleeve 24 is retained in a U-shaped strap 25 that is fixed to a frame portion 26. Importantly, the sleeve 24 is stationary and does not rotate with bearing 16.

The detailed construction of tubular sleeve 24 and its directly associated parts is best shown in FIGS. 7–10 inclusive. Fixed within the bore of tubular sleeve 24 are a pair of concentric tubes 27 and 28. Both ends of the tubes 27 and 28 are open. The front ends of the tubes 27 and 28 extend forwardly beyond the sleeve 24 to provide an extension 30. The underside of tube extension 30 is cut away as indicated by reference numeral 31, in order to reveal the interior of the tubes. The foremost end 32 of the inner tube 28 extends beyond the front end of the outer tube 27 in order to provide an anvil 33 ahead of the extension 30.

Formed between the tubes 27 and 28 is a longitudinal groove 34 that opens rearwardly of the tubes into a small auxiliary tube 35 that constitutes an entrance opening. A front exit opening 36 for groove 34 is just beyond the extension 30, yet behind the anvil 33. The groove 34 is relatively shallow and narrow in order to constitute a guide in the manner subsequently described.

The oakum includes an elongate core 37 that is comprised of a group of individually twisted fiber strands such as jute, cotton, paper, asbestos, etc., having interposed therewith a quantity of mineral oil, a mineral filler such as bentonite kaolin, attapulgite clay, diatomaceous earth, etc., and a mildew inhibitor. It will be understood that any desired number of yarns or rovings can be utilized in the core 37, such rovings being made of any material and lying either straight or twisted.

The core 37 is fed through the bore of sleeve 24 and particularly through the interior of tubes 27 and 28. Upon leaving the tubes 27 and 28, the core 37 lies immediately adjacent the extension 30 and anvil 33.

A pair of straps 40 are attached to a transverse frame bar 41, the straps 40 being spaced and adapted to hold an axle 42. Rotatively mounted on axle 42 is a spool 43 containing a supply or roll of tape 44 such as cellophane. At each side of the spool 43 is a spring 45 compressively arranged between spacers 46 and 47, the springs 45 tending to exert a compressive force on the spool 43 which tends to retard rotation of the spool 43 frictionally.

The tape 44 extends through the small auxiliary tube 35 and into the internal tube groove 34, extends out of the groove 34 through the exit opening 36, and thence extends longitudinally along the top surface of anvil 33. The groove 34 is of a size to hold the tape snugly yet permit easy sliding of the tape therethrough. The groove 34 constitutes a track for the tape 44 and assures that the tape 44 will move in a precise predetermined path of travel over the anvil 33.

Engaging the core 37 immediately below the anvil 33 is a support wheel 50 that is mounted so as to rotate freely as the core 37 is pulled through the tubes 27–28. The support wheel 50 holds the core 37 against the anvil 33. In addition, the wheel 50 backs up or reinforces the anvil 33 during sealing operation that is accomplished on the upper surface of the anvil 33.

Figure 2:
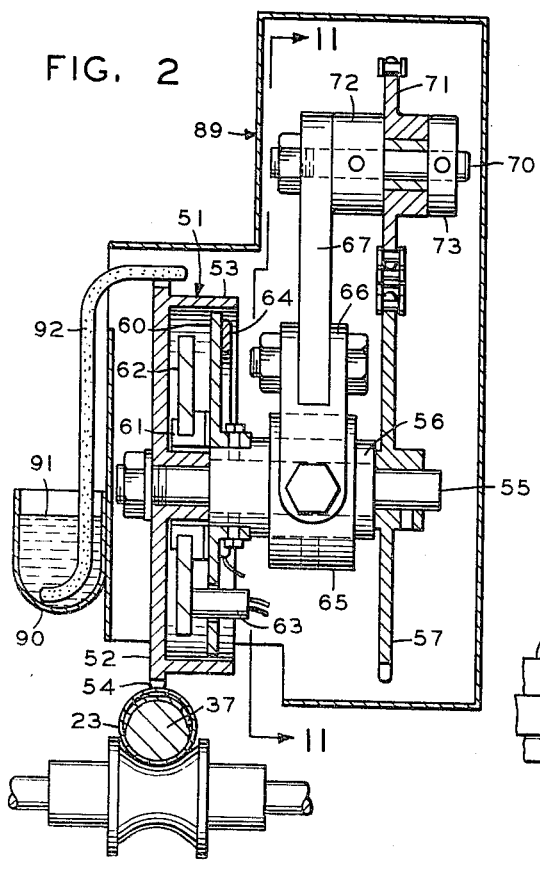
FIG. 2 is an enlarged cross sectional view of the sealing means as seen along line 2—2 of FIG. 1.
Figure 5:
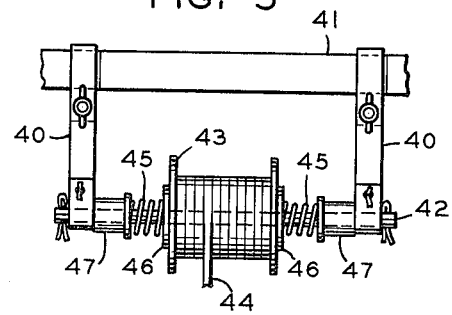
FIG. 5 is an end view of the tape holder as seen along line 5—5 of FIG. 1.
Figure 4:
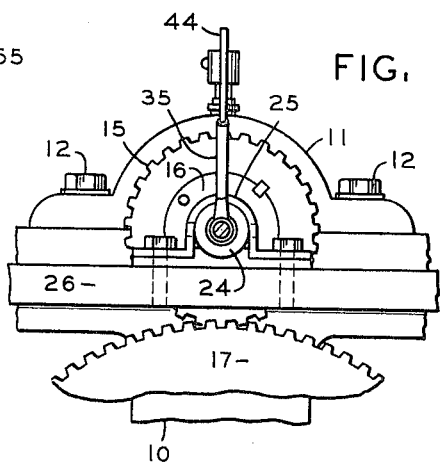
FIG. 4 is an end view as seen along line 4—4 of FIG. 1.

The heat-sealing mechanism includes a heat wheel 51 (FIG. 2) constructed of a flat circular plate 52 and a laterally extending circular flange 53, forming a cup-like structure. The heat wheel 51 is provided with a plurality of radially extending peripherally spaced teeth 54 adapted to engage the film 23 as it moves over the anvil 33 and under the teeth 54. The heat wheel 51 is drivingly attached to the shaft 55 that is rotatively mounted in bearing 56. The shaft 55 is driven by a sprocket 57 attached to the opposite end of shaft 55.

Located within and closing the cup-like structure provided by circular flange 53 of the heat wheel 51 is a stationary partition 60, the partition 60 being fixed to the bearing 56. A plurality of insulators 61 are carried by the partition 60 and project inwardly toward the wheel plate 52. The insulators 61 hold an electric heater 62 that serves to heat the wheel 51 and particularly the teeth 54. The partition 60 is provided with a pair of openings through which electrical connectors 63 extend for attachment to a source of power.

Carried on the opposite side of partition 60 is a thermostat 64 that serves to regulate the temperature of wheel 51 by controlling the operation of electrical heater 62.

The bearing 56 is flattened to receive and mount an angle bracket arm 65. Attached to the bracket arm 65 is a bifurcated bracket 66 holding an arm 67. Rotatively carried in arm 67 is a shaft 70 on which is rotatively mounted a sprocket 71. A spacer collar 72 is located between the arm 67 and the sprocket 71, the spacer collar 72 being fixed to shaft 70. A similar collar 73 is fixed to shaft 70 and is located adjacent the other side of sprocket 71. The collars 72–73 hold the sprocket 71 in place.

As is best seen in FIG. 11, a drive shaft 74 is rotatively mounted within a bearing 75. Drivingly attached to the shaft 74 is a sprocket 76. A drive chain 77 interconnects the drive sprocket 76 with a sprocket 71. One flight of chain 77 operatively engages and drives the sprocket 57.

The heat wheel 51 can be lifted out of engagement from the film 23 selectively upon discontinuance of the movement of the film 23 and core 37 through the heating zone. To accomplish this action, the bracket arm 65 is attached to the bearing 75 and the bearing 75 is attached to a balancing arm 80. A base 81 contains a solenoid mechanism generally indicated at 82 that is connected by pull arm 83 to the balancing arm 80. The solenoid 82 is connected in an electrical circuit 84 that includes a switch 85 that can be manually actuated to control solenoid 82. A counterweight 86 is attached to one end of balancing arm 80 and serves to offset to some degree the weight of the heating mechanism carried at the opposite side of the pull arm 83.

A housing 89 is provided about the heat mechanism including the heat wheel 51. A tank 90 constitutes a reservoir holding a silicone solution 91 that is applied to the teeth 54 of the heat wheel 51 by a wick 92.

It is thought that the operation and functional results of the oakum wrapping machine have become fully apparent from the foregoing description of parts, but for completeness of disclosure the cooperation of the component parts will be briefly described.

It will be assumed that the elongate core 37 extends through the innermost tube 28 and extends over the support wheel 50 and under the anvil 33, and thence is wrapped on a supply roll (not shown) that is turned at a predetermined speed to pull the core along its predetermined path of travel at a predetermined rate of speed. Moreover, it will be assumed that the film ribbon 23 is spirally wrapped about the core 37 for a sufficient length to enable the film to be pulled over the extension 30 and anvil 33 as the core 37 and its wrapped jacket 88 are pulled through the heating zone.

In addition, the heat wheel 51 is lowered into position so that the teeth 54 engage the film 23 as it appears over the anvil 33, the heat wheel 51 being driven at a predetermined speed so that the teeth 54 move at the same linear rate of speed as the core 37 and film 23.

Still further, the cellophane tape 44 is located in the elongate groove 34 and extends longitudinally over the anvil 33 immediately below the heat wheel teeth 54. It will be noted that the core 37, the jacket 88 and tape 44 are pulled through the sealing zone at a predetermined speed rate directly related to the speed of the heat wheel 51. Also, it will be noted that the film spool 22 is rotated by the pinion 15 and its attached rotary bearing 16 by the drive gear 17 at a predetermined rate of speed directly related to the linear speed at which the oakum is pulled and to the peripheral speed of the heat wheel 51, so that the film ribbon 23 is wrapped spirally in an overlapping relation about the core so as to give an overlap of approximately one half of the ribbon width, thereby providing a double thickness of the film at all points.

When the machine is operating, the film ribbon 23 is wrapped spirally on the extension 30 and about the core 37, and the oakum strand is pulled under the heat wheel 51. The spirally wrapped film 23 slips off of the tube extension 30 and moves over the anvil 33. As the film 23 and tape 44 move over the anvil and as the heat wheel 51 rotates, the teeth 54 perforate the film 23 to provide a series of regularly spaced holes 87, as is best seen in FIG. 14. As the teeth 54 form the holes 87, the peripheral margins of such holes are sealed, thereby securing the film together to form the jacket 88. The series of spaced holes 87 constitute a longitudinal seam.

Because of the particular nature of tape 44, the film ribbon 23 will not adhere to the stainless steel anvil 33 and therefore the film can be easily slipped off of the anvil 33. If the tape 44 were not present, it is entirely possible that the polyethylene film 23 would adhere to the anvil 33, and thereby cause a splitting of the film and cause a stoppage in the operation. However, the tape 44 is of cellophane which does not adhere by heat to the polyethylene film 23.

In the final product, as shown in FIG. 14, it will be realized that moisture can enter through the holes 87 and between the spirals of the film 23 which comprises the jacket 88. This moisture causes an expansion of the core 37. The film jacket 88 is elastic and capable of stretching to accommodate the increased size of the core 37.

As long as the machine operates, a continuous stand of oakum is formed. If, for any reason, the machine is stopped, that is, the heat wheel 51 ceases to turn, the film spool 22 ceases to rotate and the core 37 ceases to be pulled, it is desirable that the heat wheel 51 be raised off of the film 23 and off of the anvil 33. To accomplish this action, the switch 85 (FIG. 11) is closed to actuate solenoid 82 to pull the arm 80 downwardly, as is suggested by the broken lines in FIG. 11. As the bearing 75 rotates slightly on shaft 74, the bracket arm 65 is raised to move the shaft 55 and its associated heat wheel 51 upwardly.

Conversely, when operation is continued, the switch 85 is opened to allow solenoid 82 to raise back to its initial or static position which raises the arm 80 and consequently lowers the bracket arm 65 to place the heat wheel 51 back into contact with the film 23 on the anvil 33.

With the arrangement described above, it will be seen that the tape 44 is maintained accurately in the predetermined track and path of travel as provided by the groove 34, as the tape 44 is pulled through the sealing zone. Importantly, this tape 44 moves continuously at a predetermined rate of speed along a definite longitudinal path over the anvil 33 and under the heat wheel teeth 54. This action assures that the tape 44 will be located at all times between the film 23 and the anvil 33 and directly under the heat wheel teeth 54.

Although the invention has been described by making detailed reference to a single preferred embodiment, such detail is to be understood in an instructive, rather than in any restrictive sense, many variants being possible within the scope of the claims hereunto appended.

We claim as our invention:

1. In an oakum-wrapping machine:
   (a) means supplying an oakum core,
   (b) means directing the core along a predetermined path of travel,
   (c) means supplying a plastic film,
   (d) means wrapping the plastic film spirally in overlapping relation about the core, and
   (e) heat-sealing means engaging and sealing the overlapped portions of said film together longitudinally, the heat-sealing means providing holes in the film communicating with said core, the seal being on a limited area longitudinal of the axis of the core so as not to obstruct the entrance of moisture through the spirals of the film.

2. In an oakum-wrapping machine:
   (a) means supplying an oakum core,
   (b) an anvil located adjacent one side of the core,
   (c) means supplying a plastic film,
   (d) means wrapping the plastic film spirally in overlapping relation about the core and anvil,
   (e) heat-sealing means engaging the film over the anvil and sealing the film together in spirally-wrapped relation on a limited area longitudinal of the axis of the core so as not to obstruct entry of moisture through the spirals of the film, and
   (f) means moving the film and core simultaneously relative to said anvil and sliding the film off said anvil.

3. In an oakum-wrapping machine:
   (a) means supplying an oakum core,
   (b) an anvil located adjacent the core,
   (c) means supplying a plastic film,
   (d) means wrapping the plastic film spirally in overlapping relation about the core and anvil,
   (e) means supplying a tape of a material that does not adhere to said film,
   (f) means directing the tape between the anvil and plastic film to prevent sticking of the film to the anvil,
   (g) heat-sealing means engaging the film over the tape and anvil and sealing the film together in spirally-wrapped relation on a limited area longitudinal of the axis of the core so as not to obstruct entry of moisture through the spirals of the film, and
   (h) means moving the core, wrapped film and tape simultaneously to slide the film off the anvil and to move the tape over said anvil.

4. In an oakum-wrapping machine:
   (a) means supplying an oakum core,
   (b) a first plate located adjacent said core,
   (c) a second plate disposed over the first plate, one of said plates extending beyond the other to provide an anvil,
   (d) means supplying a plastic film,
   (e) means wrapping the plastic film spirally in overlapping relation about the core and the overlapped plates,
   (f) means supplying a tape of a material that does not adhere to said film disposed between said plates and extending over said anvil to prevent sticking of the film to the anvil,
   (g) heat-sealing means engaging the film over the tape and anvil and sealing the film together in said spirally wrapped relation on a limited area longitudinal to the axis of the core so as not to obstruct entry of moisture through the spirals of the film, and (h) means moving the core, wrapped film and tape simultaneously relative to the plates to slide the film off the plates and to move the tape over said anvil.

5. In an oakum-wrapping machine:
(a) means supplying an oakum core,
(b) a first plate located adjacent the core,
(c) a second plate overlapping the first plate, one of said plates extending beyond the other to provide an anvil,
(d) means supplying a plastic film,
(e) means wrapping the plastic film spirally in overlapping relation about the core and the overlapped plates,
(f) means supplying a tape of a material that does not adhere to said film,
(g) said plates providing a groove therebetween receiving and guiding said tape, said tape emerging from said groove and extending over said anvil and under said film to prevent sticking of the film to the anvil,
(h) heat-sealing means engaging the film over the tape and anvil and sealing the film together in said spirally wrapped relation on a limited area longitudinal to the axis of the core so as not to obstruct entry of moisture through the spirals of the film, and
(i) means moving the core, wrapped film and tape simultaneously to slide the film off the plates and to move the tape through said groove and longitudinally over said anvil.

6. In an oakum wrapping machine:
(a) means supplying an oakum core,
(b) a pair of concentric tubes through which the core extends, said tubes including an extension, one of said tubes extending beyond the other to provide an anvil forwardly of said extension,
(c) means supplying a plastic film,
(d) means wrapping the plastic film spirally in overlapping relation about the extension and core,
(e) means supplying a tape of a material that does not adhere to said film slidably disposed between said tubes and extending over said anvil and under said film to prevent sticking of film to the anvil,
(f) heat-sealing means engaging the film over the tape and anvil and sealing the film together in said spirally-wrapped relation on a limited area longitudinal to the axis of the core so as not to obstruct entry of moisture through the spirals of the film, and
(g) means moving the oakum to move the core through said tubes, to slide the film off of the extension and anvil, and to move the tape over said anvil.

7. In an oakum-wrapping machine:
(a) means supplying an oakum core,
(b) a pair of concentric tubes through which the core extends, said tubes including an extension exposing a portion of said core, one of said tubes extending beyond the other to provide an anvil forwardly of said extension,
(c) said tubes providing a groove therebetween opening at said anvil,
(d) means supplying a plastic film,
(e) means wrapping the plastic film spirally in overlapping relation about the core and extension,
(f) means supplying a tape of a material that does not adhere to said film slidably disposed in said groove and extending over said anvil and under said film to prevent sticking of the film to the anvil,
(g) heat-sealing means engaging the film over the tape and anvil and sealing the film together in said spirally-wrapped relation on a limited area longitudinal to the axis of the core so as not to obstruct the entry of moisture through the spirals of the film, and
(h) means moving the oakum to move the core through said tubes, to slide the film off of the tubes and to move the tape over said anvil.

8. In an oakum-wrapping machine:
(a) means supplying an oakum core,
(b) a pair of concentric tubes through which the core extends, said tubes including an extension, one of said tubes extending beyond the other to provide an anvil forwardly of said extension,
(c) means supplying a plastic film,
(d) means wrapping the plastic film spirally in overlapping relation about the core and extension,
(e) means supplying a tape of material that does not adhere to said film slidably disposed between said tubes and extending over said anvil under said film to prevent sticking of the film to the anvil,
(f) heat-sealing means including teeth engaging the film over the tape and anvil and sealing the film together in said spirally wrapped relation along a longitudinal seam, the teeth providing holes in the film communicating with said core, the seal being on a limited area longitudinal of the axis of the core so as not to obstruct the entrance of moisture through the spirals of the film, and
(g) means moving the oakum to move the core through said tubes to slide the film off said tubes and to move the tape over said anvil.

9. In an oakum-wrapping machine:
(a) means supplying an oakum core,
(b) a pair of concentric tubes through which the core extends, said tubes including an extension that exposes a portion of said core, one of said tubes extending beyond the other to provide an anvil forwardly of said extension,
(c) said tubes providing a longitudinal groove therebetween opening at said anvil,
(d) means supplying a plastic film,
(e) means wrapping the plastic film spirally in overlapping relation about the extension and exposed core portion,
(f) means supplying a tape of a material that does not adhere to said film slidably disposed in said groove and extending longitudinally along the anvil under said film to prevent sticking of the film to the anvil,
(g) a heat-sealing means including a wheel having peripherally spaced radially extending teeth engaging the film over the tape and anvil, said teeth sealing the film together in said spirally wrapped relation and forming holes in the film longitudinally, the seal being on a limited area longitudinal to the axis of the core so as not to obstruct the entrance of moisture through the spirals of the film,
(h) means simultaneously moving the core through the tubes, sliding the film off of the tubes and moving the tape over said anvil, and
(i) a supporting means under the exposed core portion and under said anvil.

10. In an oakum-wrapping machine:
(a) a pair of concentric tubes, one of said tubes extending beyond the other to provide an anvil, the said tubes providing a longitudinal groove therebetween opening at said anvil,
(b) means providing an oakum core extending through said tubes,
(c) means supplying a plastic film,
(d) means wrapping the plastic film spirally in overlapping relation about the core and tubes rearwardly of said anvil,
(e) means supplying a tape of a material that does not adhere to said film slidably disposed in said groove between said tubes and extending over said anvil beneath said film to prevent sticking of the film to the anvil,
(f) heat-sealing means engaging the film over the tape and anvil and sealing the film together in said spirally wrapped relation along a line longitudinal to the axis of the core so as not to obstruct entry of moisture through the spirals of the film, and
(g) means pulling the core, tape and sealed film so as to move the core through said tubes, to slide the film off of said tubes and to move the tape through said groove and over said anvil.

11. In an oakum-wrapping machine:
(a) a fixed tubular sleeve,
(b) a pair of concentric tubes fixed in said sleeve, said tubes including an extension beyond said sleeve, one of said tubes extending beyond the other to provide an anvil forwardly of said extension,
(c) means supplying an oakum core through said tubes,
(d) means supplying a plastic film,
(e) means carrying said film and rotatively mounted on said sleeve for wrapping the plastic film spirally in overlapping relation about the core and said tube extension,
(f) means supplying a tape of a material that does not adhere to said film, the tape slidably disposed between said tubes and extending longitudinally along said anvil beneath said film to prevent sticking of the film to the anvil,
(g) heat-sealing means engaging the film over the tape and anvil and sealing the film together in said spirally wrapped relation on a limited area longitudinal to the axis of the core so as not to obstruct the entry of moisture through the spirals of the film, and
(h) means moving the oakum to move the core through said tubes, to slide the film off said tubes, and to move the tape over said anvil.

12. In an oakum-wrapping machine:
(a) a fixed tubular sleeve,
(b) means supplying an oakum core through said sleeve,
(c) a first plate fixed to said sleeve and located adjacent said core,
(d) a second plate fixed relative to said sleeve and disposed over the first plate, one of said plates extending beyond the other to provide an anvil,
(e) means supplying a plastic film,
(f) means carrying the plastic film rotatively mounted on said sleeve and wrapping the plastic film spirally in overlapping relation about the core and the overlapped plates rearwardly of said anvil,
(g) means supplying a tape of a material that does not adhere to said film, the tape slidably disposed between said plates and extending longitudinally over said anvil to prevent sticking of the film to the anvil,
(h) heat-sealing means engaging the film over the tape and anvil and sealing the film together in said spirally wrapped relation on a limited area longitudinal to the axis of the core so as not to obstruct entry of moisture through the spirals of the film, and
(i) means moving the oakum to move the core through said sleeve, to slide the film off said plates and to move the tape over said anvil.

13. The combination and arrangement as recited above in claim 12, but further characterized in that the said plates are provided with a groove therebetween which receives and guides said tape, said groove opening at said anvil so that the tape emerges from said groove to extend longitudinally along said anvil.

14. In an oakum-wrapping machine:
(a) a fixed tubular sleeve,
(b) a pair of concentric tubes fixed in said sleeve, said tubes including an extension beyond one end of said sleeve, one of said tubes extending beyond the other to provide an anvil forwardly of said extension,
(c) means supplying an oakum core through said tubes,
(d) a rotative bearing mounted on said sleeve,
(e) means supplying a plastic film,
(f) means supporting the film on said bearing for wrapping the film spirally in overlapping relation about the core and said tube extension,
(g) said tubes being provided with a longitudinal groove therebetween opening at said anvil,
(h) means supplying a tape of a material that does not adhere to said film, the tape slidably disposed and guided in said groove and extending longitudinally along said anvil beneath said film to prevent sticking of the film to the anvil,
(i) heat-sealing means including teeth engaging the film over the tape and anvil and sealing the film together in said spirally wrapped relation on a limited area longitudinal to the axis of the core so as not to obstruct the entrance of moisture through the spirals of the film, the teeth providing a series of regularly spaced holes longitudinally in the film communicating with said core to allow entry of moisture, and
(j) means moving the oakum to move the core through said tubes, to slide the film off the tube extension and anvil and to move the tape longitudinally over said anvil.

15. In an oakum-wrapping machine:
(a) a fixed tubular sleeve,
(b) a pair of concentric tubes fixed in said sleeve, said tubes including an extension at the forward end of said sleeve, one of said tubes extending beyond the other to provide an anvil forwardly of said extension,
(c) said tubes providing a longitudinal groove therebetween that is open at the rear and which is open at the anvil,
(d) means supplying an oakum core through said tubes and under said tube extension and anvil,
(e) a bearing rotatively mounted on said sleeve,
(f) means supplying a plastic film,
(g) means mounting said film on said bearing and wrapping the plastic film spirally in overlapping relation about the core and the extension upon rotation of said bearing,
(h) means supplying a tape of a material that does not adhere to said film, the tape slidably extending in said groove and extending longitudinally along said anvil beneath said film to prevent sticking of the film to the anvil,
(i) a heat-sealing wheel including a plurality of radially extending teeth,
(j) means rotating said wheel,
(k) said teeth engaging the film over the tape and anvil and sealing the film together in said spirally wrapped relation on a limited area longitudinal to the axis of the core so as not to obstruct entry of moisture through the spirals of the film,
(l) a support wheel beneath said core holding the core adjacent the anvil, and
(m) means pulling the oakum to move the core through said tubes, to slide the wrapped film off the extension and anvil and to move the tape longitudinally along said groove and anvil.

References Cited by the Examiner

UNITED STATES PATENTS

| | | | |
|---|---|---|---|
| 2,607,696 | 8/1952 | Kunz | 53—28 |
| 2,898,634 | 8/1959 | Alderfer | 53—28 |
| 3,068,133 | 12/1962 | Cilker et al. | 156—187 |
| 3,161,554 | 12/1964 | Blackford | 156—242 |

EARL M. BERGERT, *Primary Examiner.*

R. J. CARLSON, R. H. CRISS, *Assistant Examiners.*